(12) United States Patent
Kumar et al.

(10) Patent No.: US 11,972,195 B2
(45) Date of Patent: Apr. 30, 2024

(54) SECTION-LINKED DOCUMENT CLASSIFIERS

(71) Applicant: Capital One Services, LLC, McLean, VA (US)

(72) Inventors: Lokesh Vijay Kumar, Frisco, TX (US); Poornima Bagare Raju, Frisco, TX (US); Ryan M. Parker, Dallas, TX (US); Brian Fromknecht, Richardson, TX (US); Chris Demchalk, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/692,846

(22) Filed: Mar. 11, 2022

(65) Prior Publication Data
US 2022/0207068 A1 Jun. 30, 2022

Related U.S. Application Data

(63) Continuation of application No. 16/898,988, filed on Jun. 11, 2020, now Pat. No. 11,275,776.

(51) Int. Cl.
| | | |
|---|---|---|
| *G06F 40/106* | (2020.01) | |
| *G06F 3/0482* | (2013.01) | |
| *G06F 16/34* | (2019.01) | |
| *G06F 16/93* | (2019.01) | |
| *G06F 16/955* | (2019.01) | |
| *G06F 16/958* | (2019.01) | |
| *G06F 40/134* | (2020.01) | |
| *G06V 30/148* | (2022.01) | |
| *G06V 30/19* | (2022.01) | |

(52) U.S. Cl.
CPC .......... *G06F 40/106* (2020.01); *G06F 3/0482* (2013.01); *G06F 16/345* (2019.01); *G06F 16/94* (2019.01); *G06F 16/9558* (2019.01); *G06F 16/972* (2019.01); *G06F 40/134* (2020.01); *G06V 30/153* (2022.01); *G06V 30/19* (2022.01)

(58) Field of Classification Search
CPC .... G06F 16/345; G06F 3/0482; G06F 40/134; G06F 16/972; G06F 16/94; G06F 16/9558; G06F 40/106; G06K 9/344; G06K 2209/01
See application file for complete search history.

(56) References Cited

U.S. PATENT DOCUMENTS

| | | |
|---|---|---|
| 5,794,236 A | 8/1998 | Mehrle |
| 6,137,911 A | 10/2000 | Zhilyaev |
| 8,327,265 B1 | 12/2012 | Vogel |
| 9,703,892 B2 | 7/2017 | Ramer et al. |

(Continued)

*Primary Examiner* — Keith D Bloomquist
(74) *Attorney, Agent, or Firm* — Sterne, Kessler, Goldstein & Fox P.L.L.C.

(57) ABSTRACT

Disclosed herein are system, method, and computer program product embodiments for rapid identification and access to relevant regulatory documents. A data model relating regulatory mandates and requirements to citations appearing within an enforcement document is used to rapidly access specific citations within an enforcement document. In the case of image-based enforcement documents, the originality of these documents is preserved while allowing a user to see where the relevant citations appear in the document images.

20 Claims, 10 Drawing Sheets

(56) References Cited

U.S. PATENT DOCUMENTS

| | | |
|---|---|---|
| 10,303,999 B2 | 5/2019 | Hertz et al. |
| 10,467,717 B2 | 11/2019 | Cai et al. |
| 10,497,059 B1 | 12/2019 | Mercurio |
| 10,509,813 B1 | 12/2019 | Pemmaraju et al. |
| 10,530,930 B2 | 1/2020 | St-Cyr et al. |
| 10,789,103 B1 | 9/2020 | Karanam et al. |
| 10,867,268 B1 | 12/2020 | Kumar et al. |
| 10,917,483 B2 | 2/2021 | Hodges et al. |
| 11,238,390 B2 * | 2/2022 | Brannon ............ G06F 21/6245 |
| 2004/0177326 A1 | 9/2004 | Bibko et al. |
| 2006/0248440 A1 | 11/2006 | Rhoads et al. |
| 2007/0011134 A1 * | 1/2007 | Langseth ............ G06F 16/254 |
| 2007/0172062 A1 | 7/2007 | Waldo et al. |
| 2007/0239706 A1 | 10/2007 | Zhang et al. |
| 2008/0059435 A1 | 3/2008 | Steensgard |
| 2009/0063438 A1 * | 3/2009 | Awad ..................... G06Q 10/10 |
| 2009/0187564 A1 | 7/2009 | Hajela et al. |
| 2009/0254543 A1 | 10/2009 | Ber et al. |
| 2010/0278453 A1 | 11/2010 | King |
| 2012/0054221 A1 | 3/2012 | Zhang et al. |
| 2012/0117082 A1 | 5/2012 | Koperda et al. |
| 2014/0129561 A1 | 5/2014 | Kern et al. |
| 2016/0350885 A1 * | 12/2016 | Clark ................. G06Q 30/0185 |
| 2017/0140009 A1 | 5/2017 | Delaney et al. |
| 2017/0185581 A1 | 6/2017 | Bojja et al. |
| 2018/0053128 A1 | 2/2018 | Costas |
| 2018/0089694 A1 | 3/2018 | Clark |
| 2018/0330455 A1 | 11/2018 | Bayyapu et al. |
| 2019/0007381 A1 | 1/2019 | Isaacson et al. |
| 2019/0102856 A1 | 4/2019 | Lyte et al. |
| 2019/0354551 A1 | 11/2019 | Gulati |
| 2020/0111023 A1 * | 4/2020 | Pondicherry Murugappan ........... G06N 20/00 |
| 2020/0175110 A1 | 6/2020 | Snyder et al. |
| 2020/0279271 A1 * | 9/2020 | Gasperecz ............ G06N 3/008 |
| 2021/0019309 A1 | 1/2021 | Yadav et al. |
| 2021/0042363 A1 | 2/2021 | Kumar et al. |
| 2021/0312133 A1 | 10/2021 | Liu et al. |
| 2021/0390126 A1 | 12/2021 | Kumar et al. |
| 2021/0390488 A1 | 12/2021 | Demchalk et al. |

* cited by examiner

SECTION-LINKED DOCUMENT CLASSIFIERS

CROSS-REFERENCE TO RELATED APPLICATIONS

This application is a continuation of U.S. patent application Ser. No. 16/898,988, filed Jun. 11, 2020, which is incorporated by reference herein in its entirety.

BACKGROUND

For companies operating in highly-regulated industries, it is critical to stay on top of new regulations and regulatory enforcement actions. In order to do this, companies often hire outside legal vendors to provide updates on regulations, typically by manually tracking changes to the regulatory landscape. Legal advisors performing this manual tracking often need to identify regulatory citations across many documents from a variety of sources, such as agency websites and news outlets.

These documents may themselves be large and densely-packed with information. Legal advisors faced with unpacking the regulatory landscape by reviewing these documents are tasked with identifying which document is relevant, and which portions of relevant documents are themselves relevant.

For this reason, it is desirable to provide approaches to simplify identification of and access to relevant regulatory documents.

BRIEF DESCRIPTION OF THE DRAWINGS

The accompanying drawings are incorporated herein and form a part of the specification.

FIG. 6 illustrates an exemplary user interface (UI), in accordance with an embodiment.

In the drawings, like reference numbers generally indicate identical or similar elements. Additionally, generally, the left-most digit(s) of a reference number identifies the drawing in which the reference number first appears.

DETAILED DESCRIPTION

Businesses in many industries need to deal with emerging risks of possible enforcement actions. For example, businesses in the heavily-regulated banking industry must be aware of possible regulatory violations they may have committed, and the possible risks from those violations based on the enforcement actions. Provided herein are system, apparatus, device, method and/or computer program product embodiments, and/or combinations and sub-combinations thereof, for rapid identification and access to relevant regulatory documents.

Presently, businesses handle the identification of enforcement actions mostly manually. For example, such businesses may manually log possible regulatory violations for follow up. Separately, such businesses may subscribe to various publications that provide updates on regulatory actions, such as enforcement actions, relevant to the operation of those businesses. Sources of enforcement actions, such as news publications, aggregators, and government websites, by way of non-limiting example, may supply updates on the various enforcement actions, and need to either be visited manually or digests of updates reviewed manually to determine the relationship to possible regulatory violations. Not only is this process time consuming, but also prone to error, such as a failure to identify and properly appraise a risk.

Figure 1:
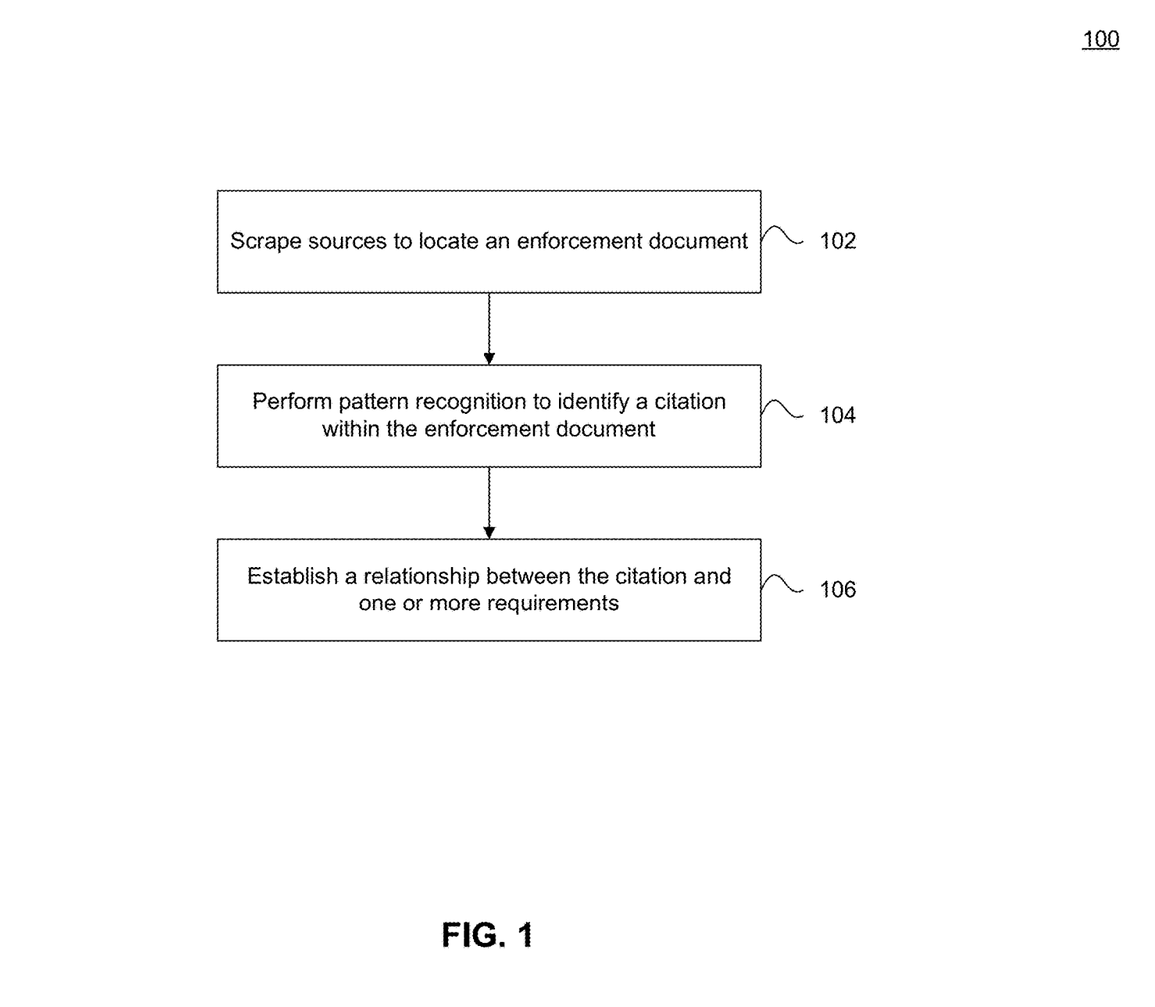
FIG. 1 is a flowchart illustrating steps by which relevant regulatory documents are identified and made available, in accordance with an embodiment.

FIG. 1 is a flowchart 100 illustrating steps by which relevant regulatory documents are identified and made available, in accordance with an embodiment. A number of sources of regulatory documents, such as publications that provide updates on regulatory actions, are scraped at step 102 to locate an enforcement document. An enforcement document is, by way of non-limiting example, a document detailing a particular enforcement action taken by a government agency. Some non-limiting examples of enforcement documents include cease and desist orders, consent orders, formal agreements, securities enforcement actions, and complaints.

At step 104, pattern recognition is performed on the enforcement document in order to identify a citation within the enforcement document. For example, optical character recognition (OCR) may be performed on the enforcement document if the enforcement document is stored as an image or a series of images. The text version of the enforcement document generated by the OCR process may be searched in order to identify a citation (e.g., a regulatory citation, such as "37 C.F.R. § 1.97"). One skilled in the relevant arts will appreciate that the citation may be identified through a number of approaches, including regular expressions (given the typically standard format of a citation) or a text search for a specific citation. With the citation identified, a relationship is established between the citation and one or more regulatory requirements at step 106, in accordance with an embodiment.

Figure 2:
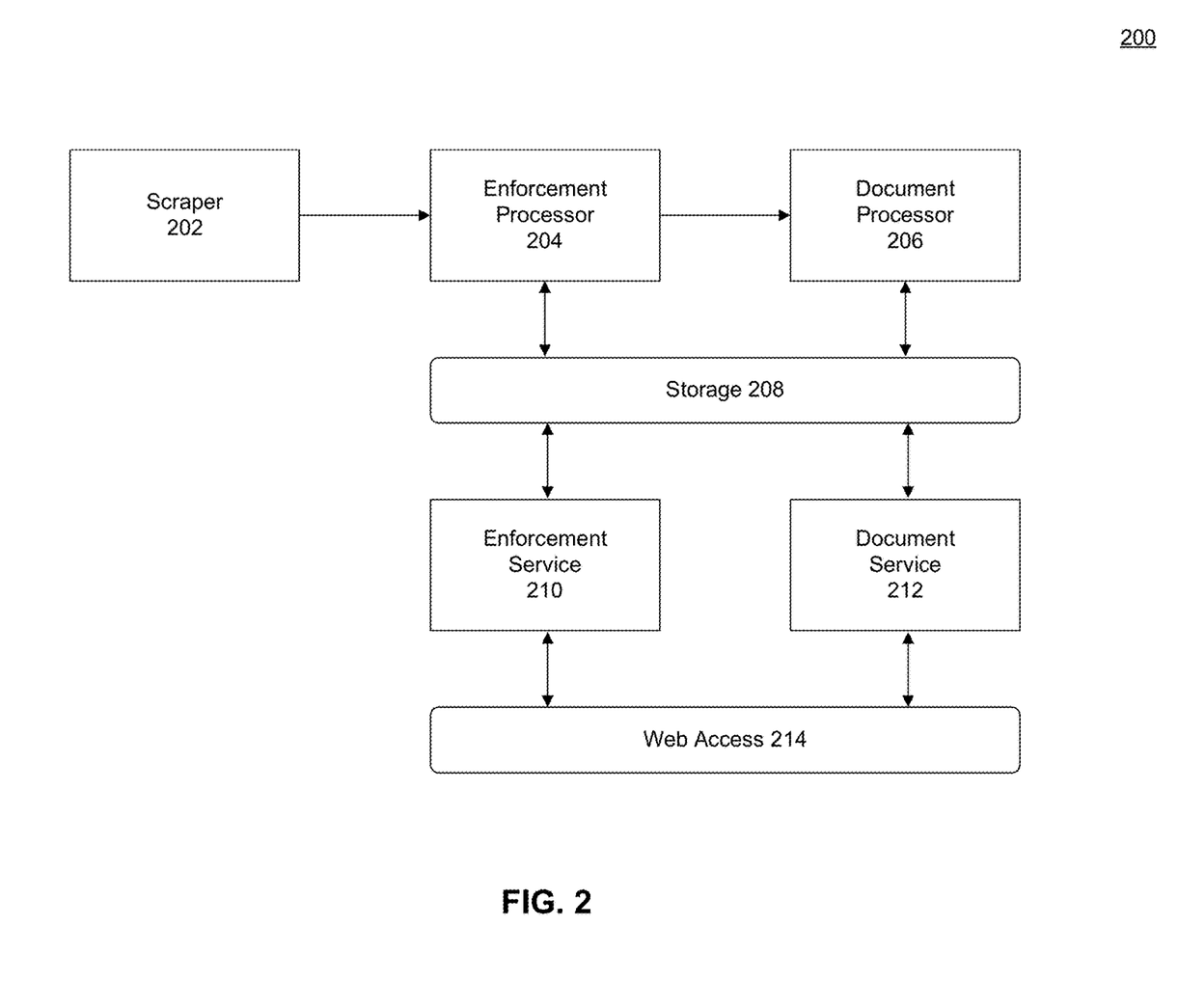
FIG. 2 illustrates an architecture for identification and presentation of relevant regulatory documents, in accordance with an embodiment.

FIG. 2 illustrates an architecture 200 for identification and presentation of relevant regulatory documents, in accordance with an embodiment. The architecture 200 is implemented as a software architecture executing on computer hardware. Architecture 200 may be disposed across multiple software components, such as individual modules, applications, or services, or may be implemented in a monolithic architecture. Architecture 200, or components thereof, may also be implemented on a single or multiple physical computing devices, including local or remote computing devices. Processes described herein need not be performed strictly within a specific software component of architecture 200 of FIG. 2, and any such relationship described herein is provided by way of non-limiting example. These implementations are provided by way of example, and not limitation, and one skilled in the relevant arts would appreciate that other implementations are contemplated within the scope of this disclosure.

Architecture 200 includes a scraper 202 that provides access to websites and other document sources of enforcement information, in accordance with an embodiment. By way of non-limiting example, document sources may include services provided by the Department of Justice, Consumer Financial Protection Bureau, Federal Trade Commission, Federal Deposit Insurance Corporation, Financial Crimes Enforcement Network, Federal Reserve Board, Office of the Comptroller of the Currency, and the U.S. Department of the Treasury on which enforcement documents are held. One skilled in the relevant arts will appreciate that any document source is usable, including but not limited to local, state, federal and private agency servers.

Each source of scraped enforcement information may be arranged in a variety of different ways, and may not itself provide an interface for directly accessing relevant information to be accessed. Accordingly, scraper 202 may include a scraping interface, in accordance with an embodiment, that provides the ability to read text information from specific sources. By way of non-limiting example, the scraping interface may look for fields within a markup language document that contain relevant text.

In accordance with an embodiment, the enforcement documents are routed through an enforcement processor 204 and a document processor 206. These processors parse the enforcement documents in various ways, detailed further herein. In particular, the enforcement processor 204 processes the enforcement documents for the purpose of parsing out information regarding enforcement actions contained in the enforcement documents, in accordance with an embodiment. The document processor 206 aids in this task by performing document-level manipulations to access the contents of the enforcement documents.

The results of the enforcement processor 204 and document processor 206 are held in storage 208, in accordance with an embodiment. Storage 208 may be, by way of non-limiting example, a database. A user wishing to access information about the enforcement actions may connect via web access 214 or other appropriate service as will be readily appreciated by one skilled in the relevant art. Web access 214 serves as a front end to enforcement service 210 and document service 212, which provide the information regarding enforcement actions from storage 208 that was stored there by enforcement processor 204 and document processor 206.

Figure 3:
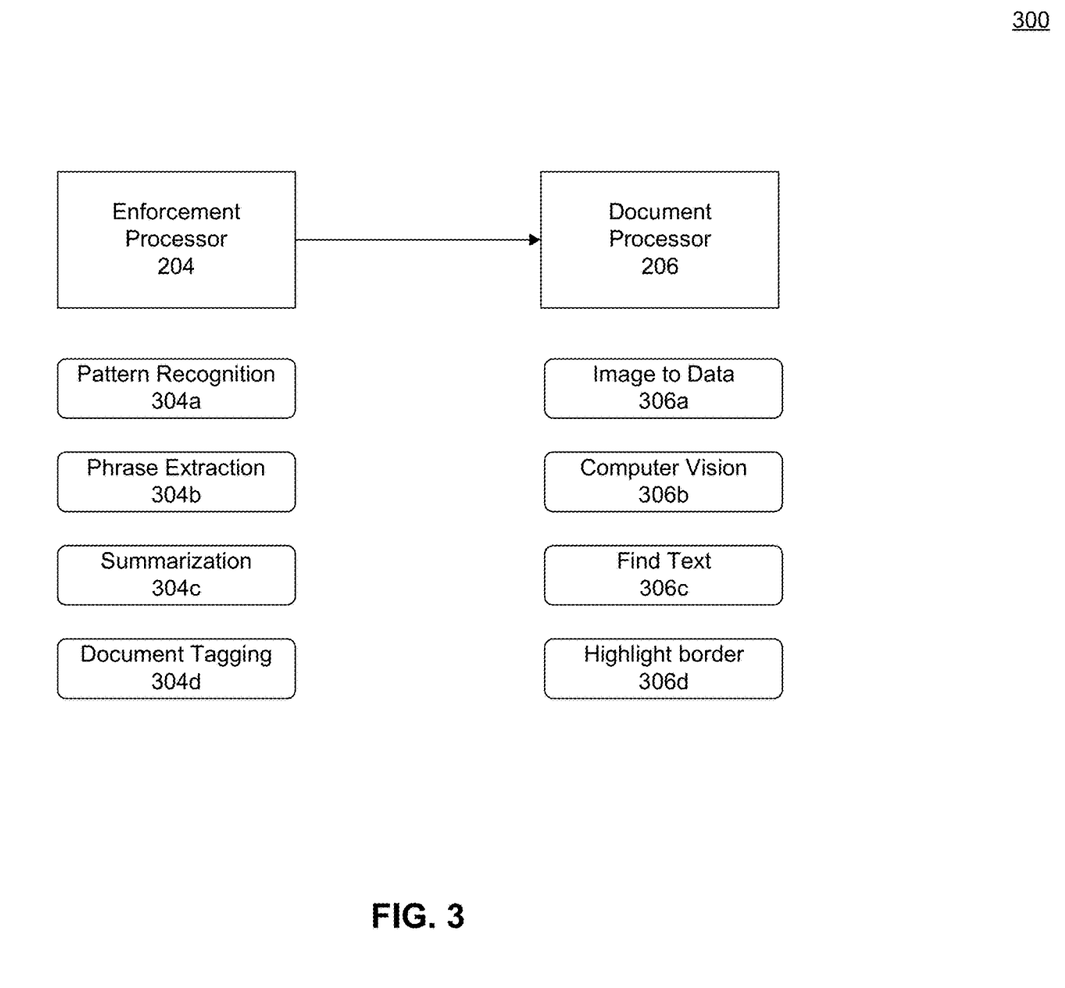
FIG. 3 illustrates components of enforcement and document processors, in accordance with an embodiment.

FIG. 3 illustrates components of the enforcement and document processors in an architecture 300, in accordance with an embodiment. As before, enforcement processor 304 and document processor 306 function together to read and interpret enforcement documents. One skilled in the relevant arts will appreciate that not all of the components illustrated in architecture 300 are required in every instance, and may not be present in every implementation.

When an enforcement document is retrieved (e.g., via scraping) it is processed by enforcement processor 304 and document processor 306 for a variety of purposes. If the document is in a text-based format, then it can be natively handled by enforcement processor 304 to identify specific element of the enforcement document.

Pattern recognition component 304a is configured to identify regulatory citations in an enforcement document, in accordance with an embodiment. One skilled in the relevant art will appreciate that other patterns may be identified in an enforcement document for association with a regulatory requirement, such as statutory citations, case law citations, and so forth. In accordance with an embodiment, the recognized pattern has a regular form. In the case of a regulatory citation, this is [TITLE] "C.F.R. § " [SECTION], and some variants thereof. Text of such regular form can be identified using regular expressions (regex). With regular expressions, all regulatory citations within an enforcement document can be found, and the appearance of those particular regulatory citations provides information about the enforcement actions taken in the enforcement document.

Phrase extraction component 304b is configured to perform phrase extraction of the enforcement document, in accordance with an embodiment. Phrase extraction may be performed as described in co-pending U.S. patent application Ser. No. 16/536,645, entitled "SEARCH PATTERN SUGGESTIONS FOR LARGE DATASETS", incorporated herein by reference in its entirety, although one skilled in the relevant art will appreciate that other approaches may be used.

Summarization component 304c is configured to generate a summary of the enforcement document, in accordance with an embodiment. For example, summarization component 304c may use extracted phrases from phrase extraction component 304b to summarize the enforcement document, although one skilled in the relevant arts will appreciate that other approaches are contemplated within the scope of this disclosure.

Document tagging component 304d is configured to classify the enforcement document according to requirements and mandates associated with enforcement actions within the enforcement document, in accordance with an embodiment. Classification and tagging of enforcement documents may be performed through a variety of mechanisms, including classification and tagging based on requirements and mandates associated with citations appearing in the enforcement document, keyword-based classification, or manual classification. However, in accordance with an embodiment, classification is performed in accordance with document classification approaches discussed in co-pending U.S. patent application Ser. No. 16/536,645, entitled "SEARCH PATTERN SUGGESTIONS FOR LARGE DATASETS", incorporated herein by reference in its entirety. For example, phrase-based scoring, in conjunction with phrase extraction component 304b, may be employed against a full set of enforcement documents in order to determine a classification and tags for scraped enforcement documents.

Each of the components of enforcement processor 304 operates on text-based enforcement documents, in accordance with an embodiment. However, in the event that an enforcement document is image-based, document processor 306 is used to provide the needed text to enforcement processor 304. Document processor 306 also provides relevant document information for output via web access 214, supporting document service 212, as illustrated in FIG. 2.

By way of non-limiting example, an image-based document, such as an enforcement document, may be stored as an image-based Portable Document Format (PDF) file, as individual image files (e.g., JPEG, TIFF, or PNG), or in some other archive as would be understood by one skilled in the relevant arts. In accordance with an embodiment, document processor 306 performs any processing alongside the enforcement document, and does not directly manipulate the enforcement document. The results of this processing are stored in storage 208 as illustrated in FIG. 2.

While a PDF document can be modified to include corresponding text along with an image of the text, in some embodiments the enforcement document must remain original. By maintaining the enforcement document intact and without modification, a user may feel comfortable that the document is exactly as it was prepared by the agency issuing it. In addition, the enforcement document can be streamed to a user directly from the source, further limiting the ability to modify its contents.

In order to interpret the contents of an image-based enforcement document, image to data component 306a extracts data from the images, in accordance with an embodiment. For example, image to data component 306a may perform OCR on the images in order to extract a text-based version of the document (usable by enforcement processor 304). In the case of an image-based PDF document, the individual pages of the PDF document are converted into individual image-based files for processing, in accordance with an embodiment.

While the text-based version of the enforcement document is usable for the tasks required by enforcement processor 304, it may be desirable to show relevant portions of the original enforcement document itself.

In accordance with an embodiment, the OpenCV library for Python may be used to operate on the image-based data of the original enforcement document. Computer vision component 306b is configured to look for certain shapes in the image-based enforcement document, in accordance with an embodiment. These shapes can be used later for finding and matching text based on the occurrence of certain shapes that correspond to words or phrases within the image-based document.

Find text component 306c is configured to match text with the shapes identified by computer vision component 306b. In accordance with an embodiment, an image-to-data conversion is performed on the image-based document (e.g., using the Python library pytessaract, which has an image_to_data function). Input text (such as a word or phrase to search for) is identified in the output data, and pixel positions corresponding to the position in the output data are obtained from the converted data. In an embodiment, the left and top coordinates, and a width and height, corresponding to the pixel positions in the image are collected for identifying the relevant portion of text in the image-based document, although one skilled in the relevant arts will appreciate that other implementations are possible within the scope of this disclosure.

Highlight border component 306d is configured to highlight the shapes corresponding to the matched text within the original image-based enforcement document. Highlight border component 306d may use the coordinate and size data from find text component 306c to overlay a duplicate image over the original which contains highlighting over regions defined by the coordinate and size data. This overlaid image may be made semi-transparent to show the text in the region in the original image-based document through the highlight. Additionally, the duplicate image may be resized and translated to any position on a display as needed to show the highlighting to a user.

Document processor 306 provides the capabilities for identifying and showing the relevant portions of text within the image-based document used by several features disclosed herein, although one skilled in the relevant arts will appreciate that other applications where text is identified within an image may be used.

The text generated by OCR (such as by image to data component 306a) lacks positional information within the image-based document itself. Computer vision component 306b may look for shapes of characters or sequences of characters within the document to identify a position in the original images of the image-based document for text from the text-based version of the enforcement document. By way of non-limiting example, words, characters, or even sentences of the text-based enforcement document may be matched to pixel positions of the image-based enforcement document using computer vision component 306b. Computer vision component 306b may look for expected heights and widths of characters within the image-based enforcement document in order to identify these pixel positions, although one skilled in the relevant arts will appreciate that other computer vision approaches may be used.

Find text component 306c is configured to obtain the pixel position information within the image-based document for given text, using the computer vision data from computer vision component 306b. And, knowing the pixel position information for this text, highlight border component 306d is able to render a highlight of the text. In accordance with an embodiment, highlight border component 306d overlays a highlight on a layer appearing above the enforcement document. In an additional embodiment, highlight border component 306d takes an image snippet from the original image-based document, inserts a highlight or highlight border in the appropriate pixel positions, and provides the image snippet for display to the user (typically in a separate panel or window from the original enforcement document).

Figure 4:
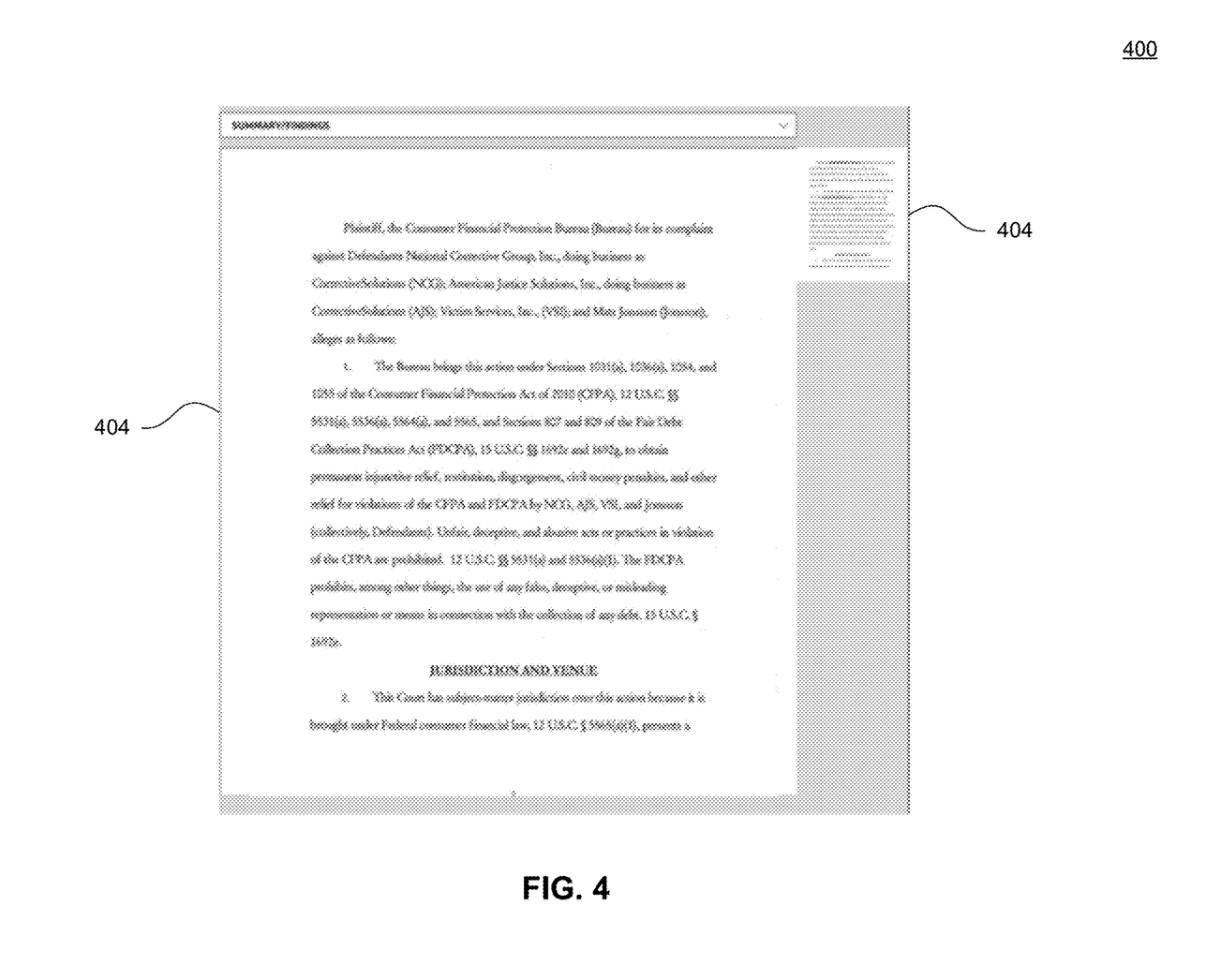
FIG. 4 illustrates an exemplary image-based document highlight implementation 400, in accordance with an embodiment.

FIG. 4 illustrates an exemplary image-based document highlight implementation 400, in accordance with an embodiment. An original, unaltered image-based document, such as an image-based PDF, may be shown in panel 402. This document may be streamed directly into a container for display in panel 402 from an original source, or may otherwise be unmodifiable to guarantee the originality of the document. In order to show text of interest in the document in panel 402, panel 404 is used to show a side-by-side image highlighting relevant text from the document, in an embodiment. One skilled in the relevant arts will appreciate that the precise positioning, sizing, and other features of the arrangement of panels 402 and 404 may vary, and the arrangement shown in document highlight implementation 400 is exemplary and non-limiting.

In order to show matched text within the image-based document, a copy of a current page of the image-based document is made, and document processor 306 of FIG. 3 performs computer vision processing to match text from a text-based version of the image-based document (e.g., a version of the image-based document that has been processed through image_to_data component 306a) to a region of pixels in the copy of the image-based document. A highlight can be inserted into the region of pixels in the copy of the image-based document, as shown in panel 404, to direct a reader's view to the corresponding position of the original, unaltered image-based document displayed in panel 402.

Figure 5:
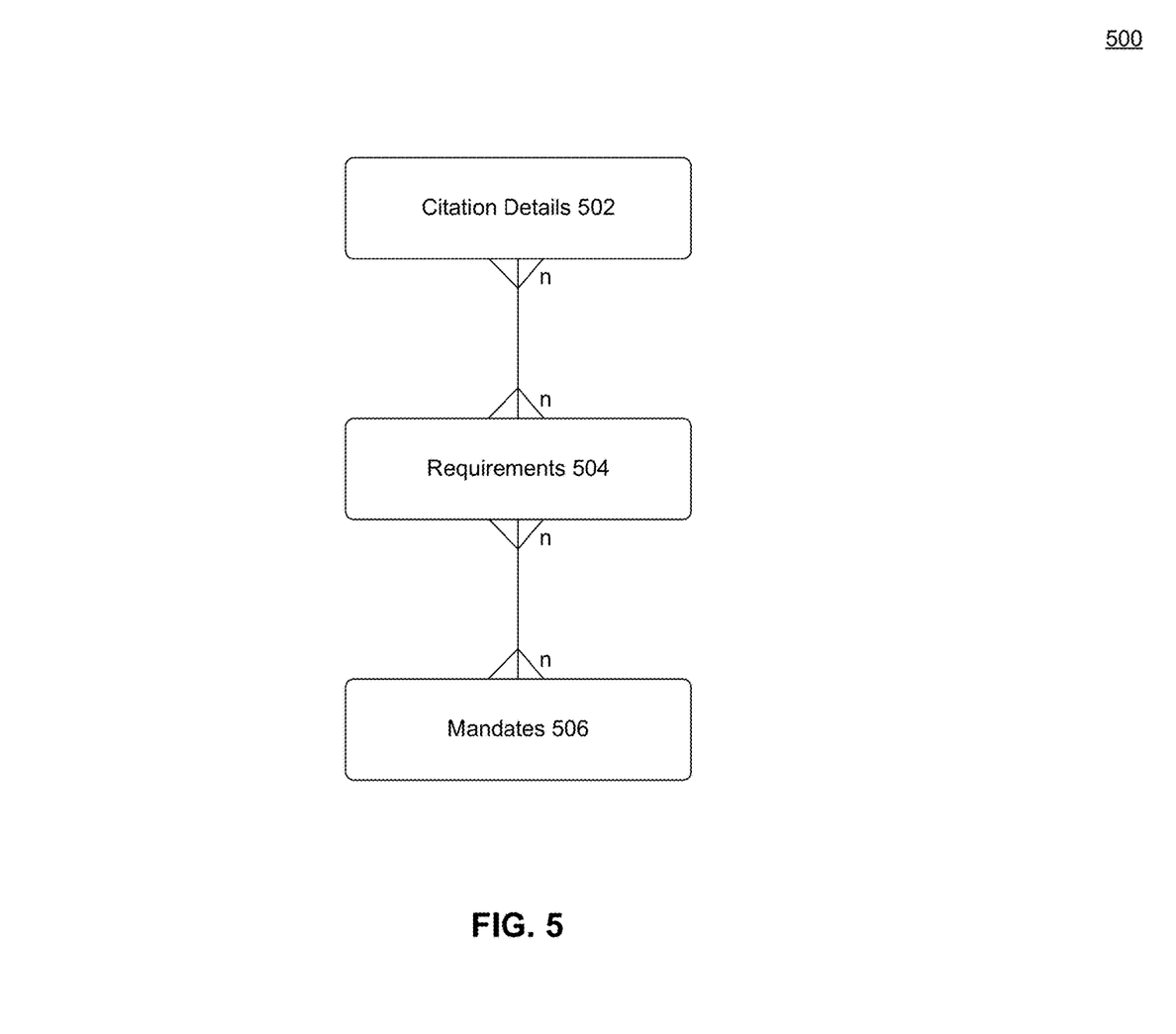
FIG. 5 is an exemplary relationship structure for associating citations in enforcement documents with regulatory requirements and mandates, in accordance with an embodiment.

FIG. 5 is an exemplary relationship structure 500 for associating citations in enforcement documents with regulatory requirements and mandates, in accordance with an embodiment. Relationship structure 500 may be implemented as a data model, usable to associate citation details 502 with regulatory requirements 504 and mandates 506 in, by way of non-limiting example, a relational database. As shown in the data model, there is an n-to-n relationship between citation details 502 and requirements 504, as well as between requirements 504 and mandates 506.

Mandates and requirements are understood, in part, by this relationship structure 500. Mandates 506 are a set of requirements 504. For example, a mandate may be a statutory law (e.g., the Fair Credit Reporting Act) that, in its implementation, is enforced through requirements. A mandate may also be an agency, such as the Office of Foreign Assets Control (OFAC), which imposes requirements. Requirements 504 may appear in more than one mandate 506, hence the n-to-n relationship. Requirements 504 are the specific obligations that an entity, such as a bank, that is subject to the mandates 506 must adhere to in order to remain compliant with the mandates 506.

Data following relationship structure 500 may be populated in a database in a number of different ways, including manually associating a citation with requirements, and requirements with mandates. In accordance with an embodiment, these relationships may also be established in accordance with document classification approaches discussed in co-pending U.S. patent application Ser. No. 16/536,645, entitled "SEARCH PATTERN SUGGESTIONS FOR LARGE DATASETS", incorporated herein by reference in its entirety. For example, using the document classification approaches, it is possible to associate a new regulatory citation (previously not identified, and not associated with any requirements 504 in the data model) with a requirement 504 on the basis of other relationships appearing in the regulatory document.

Given relationship structure 500, it is possible to understand that citation details 502 appearing in an enforcement document indicate that the enforcement document relates to one or more requirements 504 associated with the citation details 502 (and, in turn, to one or more mandates 506 associated with each of the one or more requirements 504).

One of the advantages of the approach illustrated in FIGS. 1-5 is that enforcement documents are quickly and automatically scraped, and relevant enforcement documents provided to a user. These enforcement documents may be determined to be relevant because they include citation details 502 that relate to a mandate 506 (via requirements 504) that applies to a particular line of business that the user engages in or is interested in.

But while identifying relevant enforcement documents streamlines review from millions of pages of regulatory text to only those most important documents, embodiments disclosed herein also allow a user to directly identify relevant parts of an enforcement document. This is the case even if the enforcement document is an unmodified image-based document.

FIG. 6 illustrates an exemplary user interface 600 (UI 600), in accordance with an embodiment. UI 600 may include several controls for selecting a view of an enforcement document, such as a details view 602 and a PDF viewer 604, for example. In the details view, which is selected in UI 600, information regarding the enforcement document is shown in panel 612. This information includes, by way of non-limiting example, a summary, such as a summary provided by summarization component 304b of FIG. 3.

Metadata panel 606 includes extracted information about an enforcement action included in the enforcement document, in accordance with an embodiment. This information may be obtained by enforcement processor 304 of FIG. 3 by, for example, phrase extraction performed by phrase extraction component 304b. Additionally, this information may be included in metadata available directly from the source of the enforcement document. One skilled in the relevant arts will appreciate that other approaches for populating this information are possible.

Relevant documents panel 608 includes links to other enforcement documents that share a relationship to the instant enforcement document selected in UI 600. This relationship may be established by extension from citation details 502 of FIG. 5. In accordance with an embodiment, a data model implementing relationship structure 500 may be extended to include enforcement documents. In an embodiment, this relationship is an n-to-n relationship between citation details 502 and enforcement documents. As a result, relevant documents panel 608 may show any enforcement documents that share common citation details 502. Filters may be applied to limit the number of relevant documents shown in relevant documents panel 608, such as limiting the relevant documents to those that share the most citations in common. One skilled in the relevant arts will appreciate that other implementations based on the relationship structure 500 are possible, and the foregoing examples are not limiting.

Mandates panel 610 allows a user of UI 600 to navigate to mandates, requirements, and individual citations within an enforcement document that are implicated in the enforcement document. In illustrative mandates panel 610, the mandates are collapsed into individual lines of business. In accordance with an embodiment, lines of business regulated by a particular mandate are listed in mandates panel 610 whenever the particular mandate is implicated by a requirement in the enforcement document.

Figure 7:
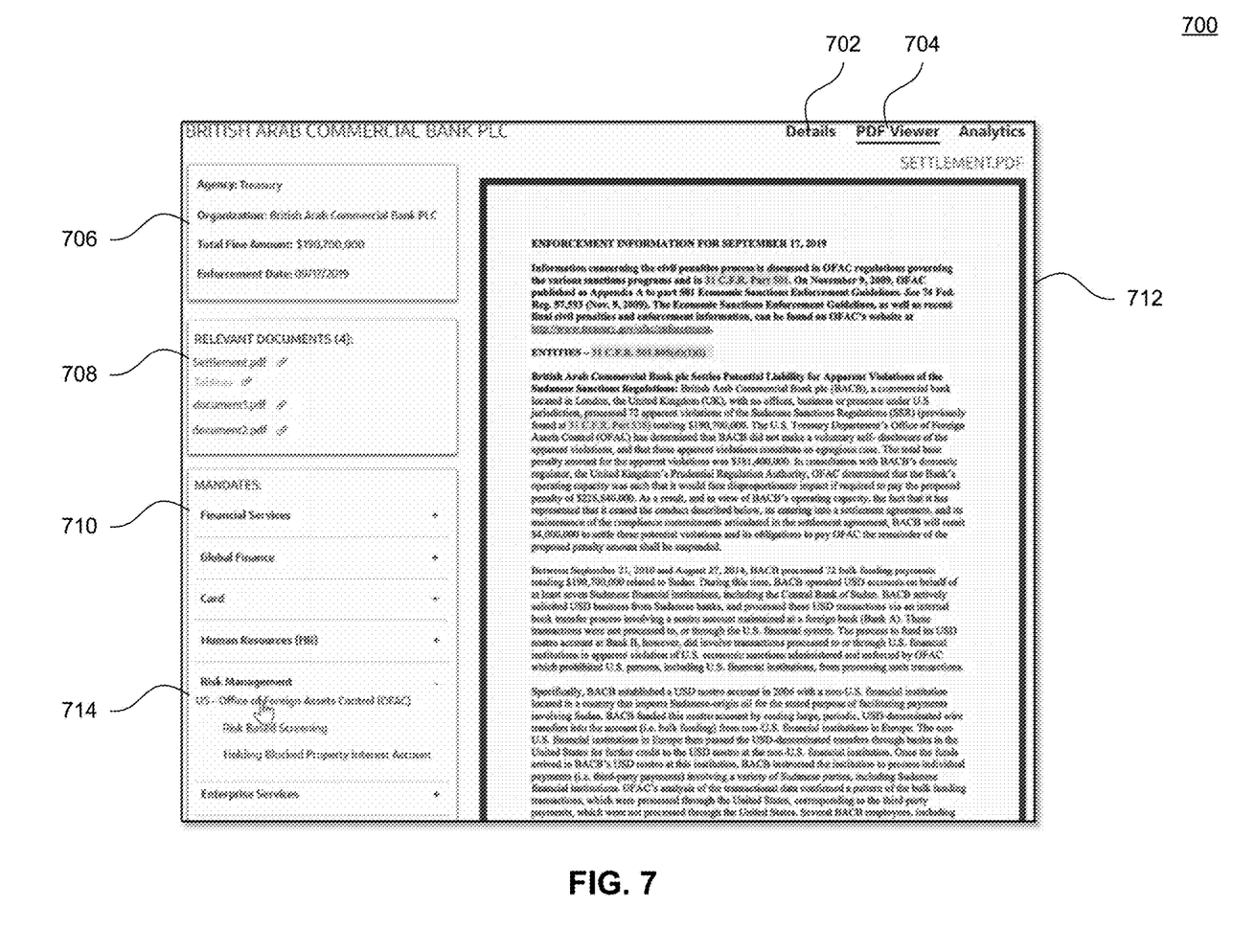
FIG. 7 illustrates an exemplary UI with relevant information highlights, in accordance with an embodiment.

FIG. 7 illustrates an exemplary UI 700 with relevant information highlights, in accordance with an embodiment. In UI 700, PDF viewer control 704 is selected (and details control 702 is available). Similar panels 706, 708, and 710 are present, corresponding to panels 606, 608, and 610 of FIG. 6 respectively. However, in UI 700 the "risk management" line of business has been expanded to show a related mandate (OFAC) and related requirements under the mandate (risk-based screening and holding blocked property interest account) that are found in the enforcement document, as shown in panel 714. Selecting a requirement from this list highlights the relevant citations in document view 712. Selecting a mandate from this list highlights the relevant citations for all related requirements in document view 712.

In accordance with an embodiment, document view 712 shows an image-based version of the enforcement document. This enforcement document is original, and highlights are shown overlaid on the document. As noted above with regard to components 306b, 306c, and 306d of document processor 306 in FIG. 3, the citations related to a mandate or requirement are shown in the image-based version of the enforcement document using the approaches described therein.

Figure 8:
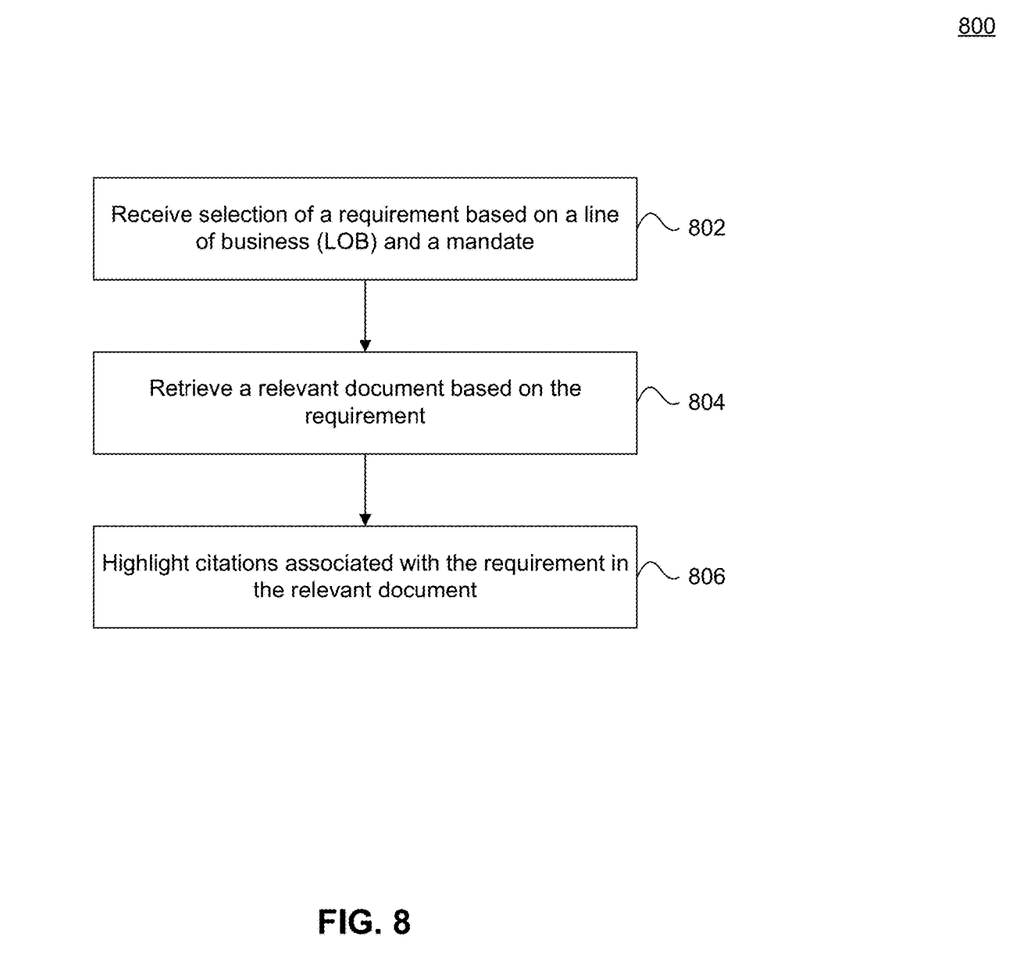
FIG. 8 is a flowchart illustrating a navigation flow, in accordance with an embodiment.

Given the relationships established in the relationship structure 500 of FIG. 5, it is possible to navigate through enforcement information in a number of ways to rapidly access relevant information. For example, given the relationship structure 500, it is possible to rapidly identify and navigate to documents related to an enforcement document currently being viewed. When an enforcement document is being viewed, it is possible to select a requirement of a mandate that is found within the enforcement document, made possible because of the enforcement-mandates-requirements relationship established in relationship structure 500. FIG. 8 is a flowchart 800 illustrating a navigation flow, in accordance with an embodiment. FIG. 8 is discussed in context with reference to UI 700 of FIG. 7. The process begins at step 802 where a line of business is selected. For example, in panel 710 of FIG. 7, a line of business named "risk management" can be expanded to show related mandates, which in turn can be expanded to show related requirements under the mandate, as shown in panel 714.

At step 804, a relevant document is retrieved based on a selected requirement associated with the line of business at step 804. For example, when panel 710 is expanded by selecting a line of business, mandates related to that line of business are shown. Relationship structure 500 of FIG. 5 allows for the determination of requirements 504 related to a given mandate 506, such that panel 710 can be populated with a list of requirements for the mandates related to the selected line of business. If a requirement 504 is selected from panel 710, a list of relevant enforcement documents can be shown, per step 804. This is accomplished by identifying citation details 502 related to the selected requirement—any enforcement documents linked to citation details 502 can be retrieved. In accordance with an embodiment, the list of relevant enforcement documents can be shown in panel 708.

An enforcement document can be selected from the retrieved enforcement documents, in accordance with an embodiment. Since this enforcement document was accessed by first selecting a requirement 504, the enforcement document can be shown at step 806 with citations associated with the requirement highlighted in advance. In this way, it is possible to quickly navigate through various enforcement documents that implicate a specific requirement of a mandate (the mandate, optionally, selected via a line of business), while having the sections of the enforcement document related to that specific requirement highlighted.

Figure 9:
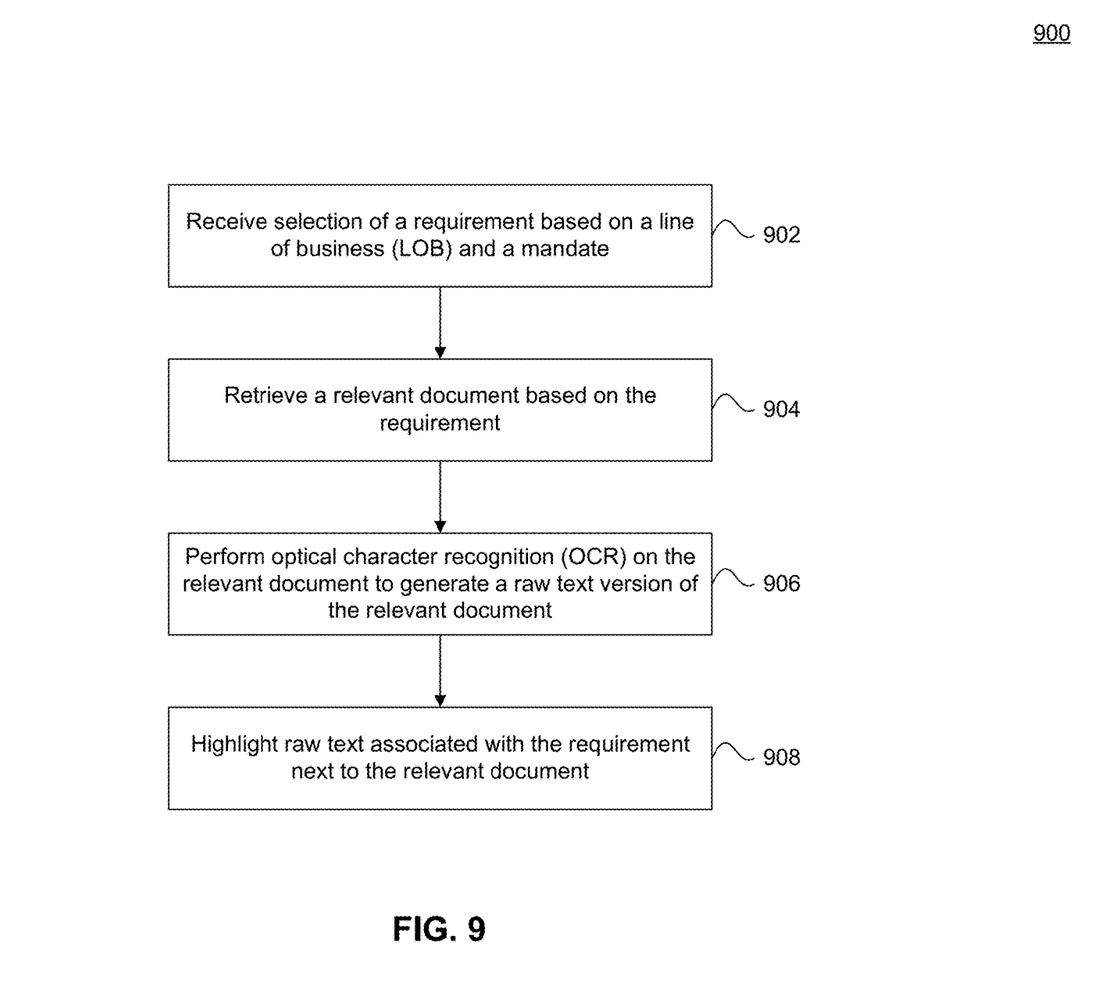
FIG. 9 is a flowchart illustrating an alternate navigation flow, in accordance with an embodiment.

Another navigation approach made possible by relationship structure 500 of FIG. 5 is the ability to quickly navigate to and view requirement information within a single enforcement document. FIG. 9 is a flowchart 900 illustrating an alternate navigation flow, in accordance with an embodiment. FIG. 9 is discussed in context with reference to UI 700 of FIG. 7. The process begins at step 902 where a mandate is selected (listed under a line of business), and a relevant document is retrieved at step 904 based on a requirement associated with the mandate.

At step 906, OCR is performed on the relevant document to generate a raw text version of the relevant document, and at step 908 the raw text is searched and highlighted for the text that is associated with the requirement. In addition, as described above, the unaltered original document can be shown (with or without its own highlighting) next to the raw text to allow a user to confirm accuracy. If a user of UI 700 were to a select a different requirement, or navigate to a different mandate and select a requirement under that different mandate, the relevant sections of the relevant document can be immediately highlighted.

Figure 10:
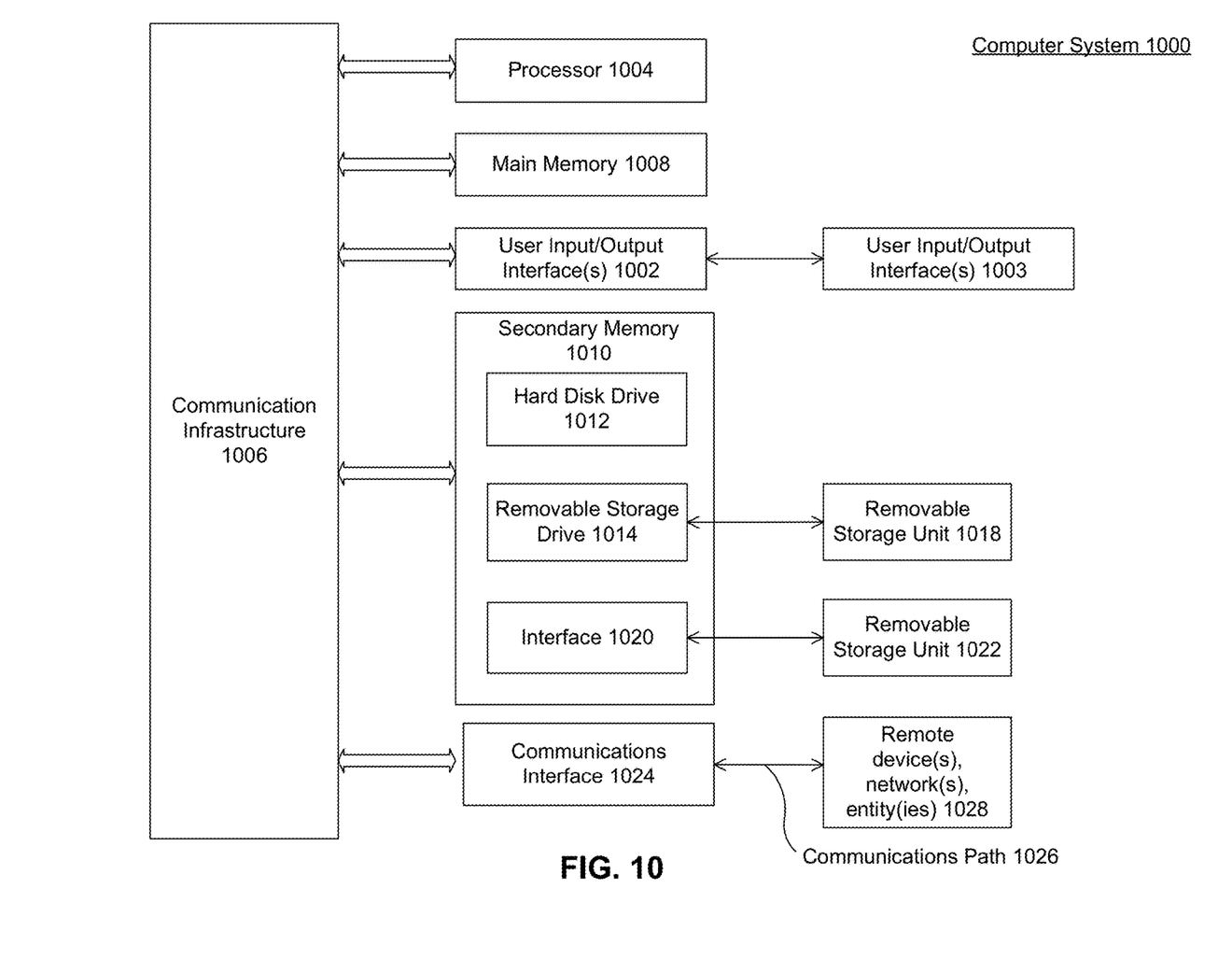
FIG. 10 is an example computer system useful for implementing various embodiments.

Various embodiments may be implemented, for example, using one or more well-known computer systems, such as computer system 1000 shown in FIG. 10. One or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
generating, by one or more computing devices, a modifiable version of an enforcement document obtained from document sources that include enforcement-related content, wherein the enforcement document is parsed to extract a corresponding enforcement action;
mapping, by the one or more computing devices, a citation within the modifiable version of the enforcement document to a requirement in accordance with a data model;
presenting, by the one or more computing devices, a list of requirements including the requirement, wherein the list of requirements is associated with a mandate through the data model;
linking, by the one or more computing devices, the enforcement document to the requirement presented in the list of requirements;
presenting, by the one or more computing devices, the enforcement document linked to the requirement in a viewer, responsive to selection of the requirement from the list of requirements; and
presenting, in the viewer, by the one or more computing devices, a portion of text within the enforcement document as relevant to the requirement, wherein the portion of text comprises a citation associated with the mandate or the requirement.

2. The computer-implemented method of claim 1, wherein the enforcement document is received as an image-based document, the method further comprising:
performing, by the one or more computing devices, optical character recognition (OCR) on the image-based document to generate the modifiable version of the enforcement document as a text-based document from the image-based document;
receiving, by the one or more computing devices, the selection of the requirement from the list of requirements; and
presenting, by the one or more computing devices, the text-based document in the viewer to include at least the portion of text with the citation associated with the mandate or the requirement highlighted.

3. The computer-implemented method of claim 2, further comprising:

presenting, by the one or more computing devices, a stream of the image-based document in the viewer by presenting a page of the image-based document corresponding to a page of the text-based document, wherein the image-based document and the text-based document are presented concurrently.

4. The computer-implemented method of claim 1, further comprising:

generating, by the one or more computing devices, a summary of the enforcement document based on the modifiable version of the enforcement document.

5. The computer-implemented method of claim 4, further comprising:

receiving, by the one or more computing devices, an additional document corresponding to the enforcement action;

mapping, by the one or more computing devices, the enforcement document and the additional document to the enforcement action in accordance with the data model; and displaying, by the one or more computing devices, a summary page including the summary of the enforcement document and links to access the enforcement document and the additional document, wherein the links are determined via the data model based on the mapping of the enforcement document and the additional document to the enforcement action.

6. The computer-implemented method of claim 5, wherein generating the modifiable version of the enforcement document corresponding to the enforcement action comprises:

connecting, by the one or more computing devices, to a repository of enforcement documents; and scraping, by the one or more computing devices, the repository to obtain the enforcement document responsive to the addition of the additional document to the repository.

7. A system, comprising:

a memory configured to store operations; and one or more processors configured to perform the operations, the operations comprising:

generating a modifiable version of an enforcement document obtained from document sources that include enforcement-related content, wherein the enforcement document is parsed to extract a corresponding enforcement action;

mapping a citation within the modifiable version of the enforcement document to a requirement in accordance with a data model;

presenting a list of requirements including the requirement, wherein the list of requirements is associated with a mandate through the data model;

linking the enforcement document to the requirement presented in the list of requirements;

presenting the enforcement document linked to the requirement in a viewer, responsive to selection of the requirement from the list of requirements; and presenting, in the viewer, a portion of text within the enforcement document as relevant to the requirement, wherein the portion of text comprises a citation associated with the mandate or the requirement.

8. The system of claim 7, wherein the enforcement document is obtained by identifying fields within a markup language document that contain relevant text.

9. The system of claim 7, further comprising a pattern recognition component configured to identify regulatory citations in the enforcement document.

10. The system of claim 9, wherein the pattern recognition component is further configured to identify other patterns in the enforcement document for association with a regulatory requirement.

11. The system of claim 7, further comprising a phrase extraction component configured to perform phrase extraction of the enforcement document.

12. The system of claim 7, further comprising a summarization component configured to generate a summary of the enforcement document.

13. The system of claim 7, further comprising a document tagging component configured to classify the enforcement document according to the requirements and mandates associated with enforcement actions within the enforcement document.

14. The system of claim 7, wherein the enforcement document is received as an image-based document, the operations further comprising:

performing optical character recognition (OCR) on the image-based document to generate the modifiable version of the enforcement document as a text-based document from the image-based document;

receiving the selection of the requirement from the list of requirements; and presenting the text-based document in the viewer to include at least the portion of text with the citation associated with the mandate or the requirement highlighted.

15. The system of claim 14, further comprising:

presenting a stream of the enforcement document in the viewer comprising presenting a page of the image-based document corresponding to a page of the text-based document, wherein the image-based document and the text-based document are presented concurrently.

16. The system of claim 7, the operations further comprising:

receiving an additional enforcement document corresponding to the enforcement action;

mapping the enforcement document and the additional enforcement document to the enforcement action in accordance with the data model; and displaying a summary page including a summary of the enforcement document and links to access the enforcement document and the additional enforcement document, wherein the links are determined via the data model based on the mapping of the enforcement document and the additional enforcement document to the enforcement action.

17. A computer readable storage device having instructions stored thereon, execution of which, by one or more processing devices, causes the one or more processing devices to perform operations comprising:

generating a modifiable version of an enforcement document obtained from document sources that include enforcement-related content, wherein the enforcement document is parsed to extract a corresponding enforcement action;

mapping a citation within the modifiable version of the enforcement document to a requirement in accordance with a data model;

presenting a list of requirements including the requirement, wherein the list of requirements is associated with a mandate through the data model;

linking the enforcement document to the requirement presented in the list of requirements;

presenting the enforcement document linked to the requirement in a viewer, responsive to selection of the requirement from the list of requirements; and presenting, in the viewer, a portion of text within the enforcement document as relevant to the requirement, wherein the portion of text comprises a citation associated with the mandate or the requirement.

18. The computer readable storage device of claim 17, the operations further comprising:

presenting a stream of the enforcement document in the viewer comprising presenting a page of an image-based document corresponding to a page of the text-based document, wherein a image-based document and the text-based document are presented concurrently.

19. The computer readable storage device of claim 17, the operations further comprising:

obtaining the enforcement document by identifying fields within a markup language document that contains relevant text.

20. The computer readable storage device of claim 17, the operations further comprising:

classifying the enforcement document according to the requirements and the mandates associated with enforcement actions within the enforcement document.

* * * * *